Patented Jan. 4, 1927.

1,612,808

UNITED STATES PATENT OFFICE.

PAUL GOLFINOPULOS, OF READING, PENNSYLVANIA.

ARTIFICIAL MARBLE.

No Drawing.  Application filed April 10, 1925. Serial No. 22,200.

This invention relates to the class of plastic compositions and pertains particularly to artificial marble.

The primary object of this invention is the provision, in a manner as hereinafter set forth, of a compound having cement mixed therewith, which when set hard will give a substance simulating in appearance and texture marbles of various types.

Another object of the invention is the provision, in a manner as hereinafter set forth, of a compound adapted to become hardened and when so formed to imitate marble of various type, and further having a quality which is well adapted to take a high polish the same as real marble.

A further and final object of the invention is the provision, in a manner as hereinafter set forth, of an artificial marble which in all respects is indistinguishable from the natural product, the ingredients of which artificial product are inexpensive, and therefore may be combined to produce at small cost, an article fully equal in every respect to the most expensive and beautiful type of marble.

The invention comprises the mixing together of silver sand, marble dust, beeswax, turpentine and cement, together with any desirable coloring matter, either single colors or of mixed colors. The particular types of cements used are those known as Atlas white and Portland white cements, taking preferably equal parts of each. These ingredients are thoroughly mixed together and the proper amount of water added to make an easily handled pourable mix. The mixture is then turned into molds and allowed to solidify. After becoming thoroughly hardened, the solidified mixture is then worked upon with the polishing mixtures or tools and a very high polish may be imparted to the article.

Through extensive experimentations to determine the various portions of ingredients necessary to produce a perfectly blended mixture, applicant has found that the best results has been obtained when combining the ingredients in approximately the following proportions. To every five pounds of cement used there is taken:—

2 pounds of silver sand, 1 pound of marble dust, 4 ounces of beeswax, 8 fluid ounces of turpentine, 8 ounces of coloring matter.

As above stated these ingredients are thoroughly mixed and sufficient water added thereto to make a pourable mixture.

In mixing the coloring matter directly with the other ingredients, the same can be put in after the other ingredients have been thoroughly mixed, and thereafter the mix so stirred so that the coloring materials will streak therethrough and when the mixture has set the colors will be extended throughout the set body and same can be cut in any desired manner without fear of getting below the coloring matter therein, as would be the case in cutting other colored artificial marble where the coloring matter is only veneered on to the surface or does not permeate the entire mass of material.

In order to further strengthen the product resulting from the formation of a mass after the formula given, applicant passes through the body suitable strengthening wires so that upon the setting of the mass the wires become firmly imbedded therein and add rigidity to the body.

Articles made in connection with the formula above set forth have been found to be strong and durable and to take a high polish, to give to the same the appearance of a natural high grade marble.

Having thus described my invention what I claim is:

A method of producing an artificial marble, which consists in mixing white cement, silver sand, marble dust, beeswax, turpentine and water, to have the consistency of a pourable mass, then subjecting the said mass to agitation to thoroughly mix said constituents, then adding coloring matter to the mass while under a state of agitation to provide for the coloring matter to streak the mass and finally effecting the setting of said mass.

In testimony whereof, I affix my signature hereto.

PAUL GOLFINOPULOS.